United States Patent
Fair et al.

(10) Patent No.: US 9,796,403 B2
(45) Date of Patent: *Oct. 24, 2017

(54) SHOPPING CART LINER WITH TOY ATTACHMENT SYSTEM

(71) Applicant: The Boppy Company, LLC, Golden, CO (US)

(72) Inventors: Paul Fair, Denver, CO (US); Kristin A. Tidwell, Burnsville, NC (US); Catherine P. McNeil, Golden, CO (US); Clarice Bonzer, Littleton, CO (US)

(73) Assignee: The Boppy Company, LLC

( * ) Notice: Subject to any disclaimer, the term of this patent is extended or adjusted under 35 U.S.C. 154(b) by 746 days.

This patent is subject to a terminal disclaimer.

(21) Appl. No.: 14/178,635

(22) Filed: Feb. 12, 2014

(65) Prior Publication Data

US 2014/0159446 A1    Jun. 12, 2014

Related U.S. Application Data

(63) Continuation of application No. 12/827,768, filed on Jun. 30, 2010, now Pat. No. 8,696,400, which is a
(Continued)

(51) Int. Cl.
*A63H 33/00* (2006.01)
*B62B 5/08* (2006.01)
(Continued)

(52) U.S. Cl.
CPC ........... *B62B 5/082* (2013.01); *A63H 33/006* (2013.01); *B62B 3/1448* (2013.01);
(Continued)

(58) Field of Classification Search
USPC ................. 446/227, 107; 206/278, 289–291; 5/93.1, 655; 248/229.26, 228.7, 230.7,
(Continued)

(56) References Cited

U.S. PATENT DOCUMENTS 2,317,176 A    4/1943 Byrd
2,884,638 A    5/1959 Ream
(Continued)

OTHER PUBLICATIONS

International Search Report and Written Opinion for PCT/IB2010/002835 dated Apr. 1, 2011, 9 pages.
(Continued)

*Primary Examiner* — Aarti B Berdichevsky
*Assistant Examiner* — Urszula M Cegielnik
(74) *Attorney, Agent, or Firm* — Kilpatrick Townsend & Stockton LLP

(57) ABSTRACT

A shopping cart liner includes a body configured to nest in the child seat portion of a shopping cart. The body may define one or more openings positioned to enable the feet of a child seated in the shopping cart to protrude through the body, and the shopping cart liner includes a track at least partially embedded in a portion of the shopping cart liner. A clip is slidingly engaged with the track, and defines an opening for attaching an item to the shopping cart liner. An item such as a toy, teething ring, pacifier, or other item may be attached. The body may be padded, and, and may include one or more pockets. The shopping cart liner may include a seat belt for securing a child to the shopping cart liner, and may be used in combination with a pillow.

22 Claims, 18 Drawing Sheets

Related U.S. Application Data continuation-in-part of application No. 12/619,481, filed on Nov. 16, 2009, now Pat. No. 8,460,053.

(51) Int. Cl.
 *B62B 3/14* (2006.01)
 *B62B 9/26* (2006.01)

(52) U.S. Cl.
 CPC .............. *B62B 3/1456* (2013.01); *B62B 9/26* (2013.01); *B62B 3/1452* (2013.01); *Y10T 24/45099* (2015.01); *Y10T 24/45545* (2015.01); *Y10T 24/45901* (2015.01); *Y10T 29/49947* (2015.01)

(58) Field of Classification Search
 USPC .......... 248/31.81; 224/411, 409; 297/256.17; 280/33.992, 33.993
 See application file for complete search history.

(56) References Cited

U.S. PATENT DOCUMENTS

| | | | |
|---|---|---|---|
| 3,665,880 A | 5/1972 | Ambrose | |
| D231,810 S | 6/1974 | Daley | |
| 4,654,991 A * | 4/1987 | Jones | 40/617 |
| 4,664,640 A | 5/1987 | Shindo et al. | |
| 4,784,496 A | 11/1988 | Weiss | |
| 4,805,937 A | 2/1989 | Boucher et al. | |
| 4,945,586 A | 8/1990 | Cross et al. | |
| 5,238,293 A | 8/1993 | Gibson | |
| 5,337,987 A | 8/1994 | Sawatsky | |
| 5,400,990 A | 3/1995 | Frankel | |
| 5,412,848 A | 5/1995 | Precourt, Jr. | |
| 5,419,432 A * | 5/1995 | Ingram | 206/287.1 |
| 5,494,306 A | 2/1996 | Adamson et al. | |
| 5,678,888 A | 10/1997 | Sowell et al. | |
| 5,702,039 A | 12/1997 | Olaiz | |
| 5,715,571 A | 2/1998 | Fasano | |
| 5,722,576 A | 3/1998 | Rogers | |
| 5,855,412 A | 1/1999 | Smith et al. | |
| 5,895,305 A | 4/1999 | Cowley et al. | |
| 6,036,263 A | 3/2000 | Gold | |
| 6,109,765 A | 8/2000 | Blanton | |
| 6,129,418 A | 10/2000 | Bergh et al. | |
| 6,142,565 A | 11/2000 | Rieder | |
| 6,234,858 B1 | 5/2001 | Nix | |
| 6,321,403 B1 | 11/2001 | Matthews | |
| 6,428,098 B1 | 8/2002 | Allbaugh | |
| 6,442,759 B1 | 9/2002 | Straham, Jr. et al. | |
| 6,484,739 B1 | 11/2002 | Sofie et al. | |
| 6,499,708 B1 | 12/2002 | Cowen | |
| 6,634,067 B2 | 10/2003 | Jacobson | |
| 6,702,381 B2 | 3/2004 | Edicott et al. | |
| 6,705,950 B2 | 3/2004 | Wood et al. | |
| 6,752,457 B2 | 6/2004 | Gold et al. | |
| 6,811,065 B1 | 11/2004 | Brady | |
| 6,817,066 B1 | 11/2004 | Williams et al. | |
| 6,851,749 B2 | 2/2005 | Norman | |
| 6,938,958 B2 | 9/2005 | Gold et al. | |
| 6,966,089 B2 | 11/2005 | Gold et al. | |
| 7,029,066 B1 | 4/2006 | Myers-Jones | |
| 7,189,136 B1 * | 3/2007 | Ehm | 446/227 |
| 7,219,373 B2 | 5/2007 | McNamara | |
| 7,311,357 B2 | 12/2007 | Gold et al. | |
| 7,374,240 B2 | 5/2008 | Gold et al. | |
| 7,430,765 B2 | 10/2008 | Brown et al. | |
| 7,588,291 B2 | 9/2009 | Gold et al. | |
| 7,636,949 B1 | 12/2009 | Shooshan | |
| 8,042,869 B2 | 10/2011 | McClintock et al. | |
| 8,336,173 B2 | 12/2012 | Pontaoe et al. | |
| 8,460,053 B2 | 6/2013 | Fair et al. | |
| 8,696,400 B2 | 4/2014 | Fair et al. | |
| 2002/0077020 A1 | 6/2002 | Graf et al. | |
| 2004/0232756 A1 | 11/2004 | Lin | |
| 2006/0183397 A1 * | 8/2006 | Kanahele et al. | 446/26 |
| 2006/0232112 A1 | 10/2006 | Karr | |
| 2007/0087657 A1 | 4/2007 | Campbell et al. | |
| 2008/0258437 A1 | 10/2008 | Ryan et al. | |

OTHER PUBLICATIONS

Bebe Chic Products, http://www.bebechic.com/strollers.asp, downloaded Aug. 24, 2010, 1 page.
Boo Yah Baby—Stroller Liners, http://booyahbaby.com/Stroller-Liners/, downloaded Aug. 24, 2010, 4 pages.
Bumbleride—The Ride of Your Life, http://www.bumbleride.com/strollers/footmuff.php, downloaded Aug. 24, 2010, 1 page.
Clean Shopper Shopping Cart Covers, http://www.cleanshopper.com/static.php?page=shopping_cart_covers, downloaded Aug. 24, 2010, 3 pages.
Eddie Bauer Reversible Stroller Liner, http://www.target.com/dp/B0033A42L2/ref=gp_se_search-results-asin-redirect, downloaded Aug. 24, 2010, 2 pages.
Eddie Bauer Shopping Cart Cover, http://www.toysrus.com/product/index.jsp?productId=3697563, downloaded Aug. 24, 2010, 2 pages.
Floppy Seat Shopping Cart Cover and Restaurant High Chair Cover for Babies, http://www.floppyseat.com/index.html, downloaded Aug. 24, 2010, 3 pages.
Infantino, http://www.infantino.com/ShoppingCartCovers/ShoppingCartCovers.php, downloaded Aug. 24, 2010, 1 page.
Koochy-Kooz, Cozy Stroller Liners, http://koochykooz.com/main.html, downloaded Aug. 24, 2010, 4 pages.
Luxury Stroller Liners/Stroller Pads, http://www.tivolicoutre.com/Luxury-Stroller-Liners-Stroller-Pads.htm, downloaded Aug. 24, 2010, 2 pages.
myMonkeymoo—Stroller Pads, http://mymonkeymoo.com/stroller-pads.html, downloaded Aug. 24, 2010, 1 page.
Prop 'R Shopper, http://leachco.stores.yahoo.net/proprshopper.html, downloaded Aug. 24, 2010, 1 page.
Pure Joy Collection—Stroller Liners, http://purejoycollection.com/Stroller_Liners.html, downloaded Aug. 24, 2010, 3 pages.

* cited by examiner

SHOPPING CART LINER WITH TOY ATTACHMENT SYSTEM

This application is a continuation of U.S. patent application Ser. No. 12/827,768, titled "Shopping Cart Liner With Toy Attachment System" filed on Jun. 30, 2010, which is a continuation-in-part of U.S. patent application Ser. No. 12/619,481, titled "Toy Attachment Systems and Methods" and filed Nov. 16, 2009, the entire disclosure of which is hereby incorporated by reference herein.

CROSS REFERENCE TO RELATED APPLICATIONS

This application is related to application Ser. No. 12/827,823, filed on Jun. 30, 2010 and assigned to the same assignee as this application and titled "Stroller Liner with Toy Attachment System", the entire disclosure of which is hereby incorporated by reference herein. This application is also related to application Ser. No. 12/827,870, filed on Jun. 30, 2010 and assigned to the same assignee as this application and titled "Pillow with Toy Attachment System", the entire disclosure of which is hereby incorporated by reference herein.

BACKGROUND OF THE INVENTION

Various kinds of equipment and accessories have been developed for facilitating the care of infants and young children. While safety is of primary importance, it is also desirable that child care equipment contribute to the mental and physical development of the child, provide stimulation and entertainment for the child, and be convenient to use.

BRIEF SUMMARY OF THE INVENTION

In one embodiment, a shopping cart liner includes a body configured to nest in the child seat portion of a shopping cart, the body defining one or more openings positioned to enable the feet of a child seated in the shopping cart to protrude through the body. The shopping cart liner also includes a track at least partially embedded in a portion of the shopping cart liner, and at least one clip slidingly engaged with the track, the clip defining an opening for attaching an item to the shopping cart liner. The body may be padded. In some embodiments, the track is embedded in a portion of the shopping cart liner that a child faces when the shopping cart liner is in use. For example, the track may be disposed along the handle of the shopping cart when the shopping cart liner is in use. The shopping cart liner may further include a seat belt for securing the child to the shopping cart liner.

In some embodiments, the track is embedded by wrapping it in a fabric sleeve sewn into the shopping cart liner. The shopping cart liner may be used in combination with a pillow disposed within the shopping cart liner to support the child when the shopping cart liner and pillow are in use. The pillow may be generally arc shaped, having two curved arms extending from a midsection, to define an open well to receive the child. The shopping cart liner may further include a pocket in an outside surface of the shopping cart liner.

In some embodiments, the shopping cart liner may be used in combination with an item attached to the shopping cart liner via the clip. The item may be an item selected from the group consisting of a toy, a doll, a ball, a mirror, a block, a pyramid, a teething ring, a toy shaped like an animal or insect, a toy shaped like a plant or flower, an item that generates sound, an item that generates vibration, and an item that generates light. In some embodiments, the shopping cart liner may be used in combination with an item to be attached to the shopping cart liner, the item comprising a main body larger than the opening in the clip, and the item including a compressible member connected to the main body, wherein the compressible member is larger than the opening when the compressible member is in an uncompressed state, and the compressible member is configured to be compressible to a size smaller than the opening so that the compressible member can be passed through the opening to place the compressible member and the main body on opposite sides of the opening. The track may be a semi-rigid rod having a substantially circular cross section. In some embodiments, the shopping cart liner may be used in combination with a tote bag.

According to another embodiment, a method of using a shopping cart includes providing a shopping cart liner including a body configured to nest in the child seat portion of a shopping cart, the body defining one or more openings positioned to enable the feet of a child seated in the shopping cart to protrude through the body. The provided shopping cart liner further includes a track at least partially embedded in a portion of the shopping cart liner and a clip slidingly engaged with the track, the clip defining an opening for attaching an item to the shopping cart liner. The method according to this embodiment further includes nesting the shopping cart liner in the seat portion of the shopping cart, and seating the child in the lined seat portion of the shopping cart. The method may further include attaching an item to the clip via the opening. In some embodiments, the method further includes adjusting the position of the item by sliding the clip along the track.

In some embodiments, the shopping cart liner further includes a seat belt, and the method further includes securing the seat belt around the child. The method may also include providing a generally arc shaped pillow, the pillow having two curved arms extending from a midsection to define an open well to receive the child; and placing the pillow in the lined seat portion of the shopping cart prior to seating the child. In some embodiments, the method further comprises seating the child in the open well with the pillow fitting around the child's waist to support the child in an upright seated position.

DETAILED DESCRIPTION OF THE INVENTION

Embodiments of the invention include systems and methods of attaching toys or other items to child care equipment, and include pieces of child care equipment having features for attaching toys or other items.

In some embodiments, the piece of child care equipment is configured to include a track, such as a rod, and a sliding member that moves along the track. The sliding member is configured so that one or more toys or other items can be easily and releasably attached to it. Toys or other attached items can be interchanged and moved to different locations as desired. For example, the track may be suspended above a baby in a play gym, and toys hanging from the track may be moved to be within the baby's reach. The track may also be part of another kind of equipment, such as a pad or pillow, and attached toys or other items can be moved to a location where the child is lying. Other kinds of attachments may also be provided. The track may be completely embedded within the piece of equipment, such as within a fabric sleeve, with the clip sliding over a fabric sleeve. Alternatively, the track may be coupled to the equipment such that the track remains exposed. In this way, the clip slides directly over the track.

Figure 1A:
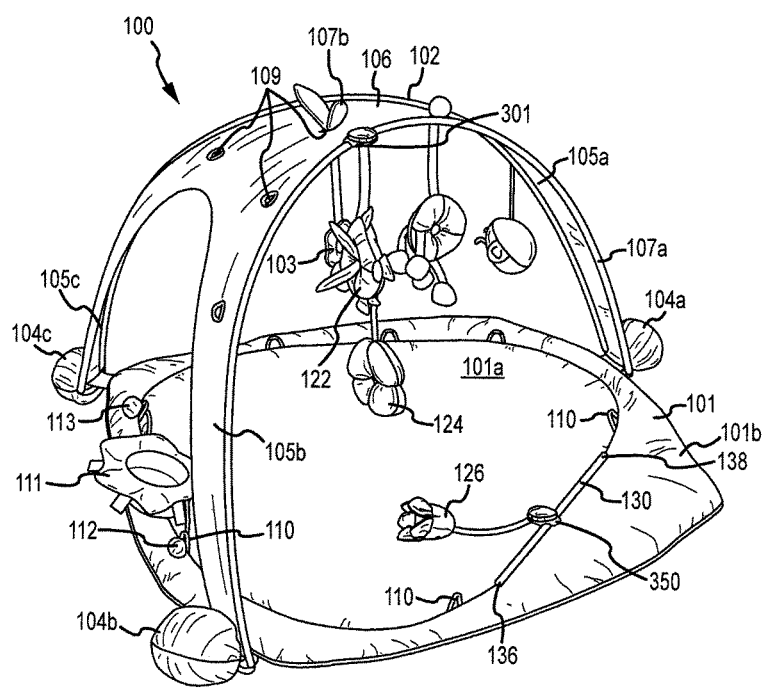
FIG. 1A shows an infant play gym in accordance with embodiments of the invention.

For example, FIG. 1A shows an infant play gym 100 in accordance with embodiments of the invention. Play gym 100 comprises a base pad 101, and a canopy 102. In one mode of use, play gym 100 is placed on a floor. Base pad 101 includes a padded center portion 101a and a padded peripheral portion 101b that forms an outer boundary for holding the baby. A seam is formed between portions 101a and 101b where the fabric from each of the portions is joined together. One convenient way to construct base pad 101 is by placing a batting on the fabric, then sewing the fabric together to form the various seams. The stitching between center portion 101a and peripheral portion 101b serves to limit the amount of shifting of the fill material. An infant is placed on base pad 101, and may interact with various toys or other items such as item 103 suspended from canopy 102 or attached to base pad 101. Play gym 100 thus provides a safe, comfortable, and convenient place for the baby to spend time, and also provides stimulation for the baby's entertainment and development. Play gym 100 may be especially useful for the care of infants who have not yet begun to crawl. Having items attached to play gym 100 keeps the baby's toys in a contained area and within the baby's reach.

Base pad 101 may be, for example, made of a soft cloth or fabric, and may be filled with padding such as foam or fiberfill padding or batting. Base pad 101 is preferably of a size suitable for holding a baby. For example, base pad 101 may be about 30 to 36 inches across, but other larger or smaller sizes may be used. Base pad 101 may be of any suitable shape, including round, oval, oblong, rectangular, or another shape.

Base pad 101 includes three attachment members 104a-c affixed to an edge portion of base pad 101. One of skill in the art will recognize that more attachment members may be provided. Attachment members 104a-c may be, for example, fabric-covered foam or fiberfill material in a ball shape, or another suitable shape. While attachment members 104a-c are preferably compressible, substantially rigid shapes could be used as well, for example plastic balls. Each of attachment members 104a-c may be affixed to base pad 101 by sewing a portion of the covering of the respective attachment member into an edge seam of base pad 101, by sewing a tether to both the attachment member and base pad 101, or by any other suitable means.

Canopy 102 is configured to arch over base pad 101, standing on three legs 105a-c, forming an arched support frame. Canopy 102 may reach a height of, for example, 12-24 inches over base pad 101, and may be used to hang toys or other items 103 within reach of a baby placed in play gym 100. One of skill in the art will recognize that more legs and other dimensions could be used. Canopy 102 comprises a surface sheet 106, which may be, for example, a fabric or plastic sheet, and may be of a single thickness, or comprise multiple thicknesses of one or more materials. Surface sheet 106 may be made of multiple pieces integrated together, and the pieces need not be of the same materials. Canopy 102 also includes at least two semi-rigid rods 107a and 107b embedded within canopy 102. Semi-rigid rods 107a and 107b may be, for example, made of a plastic, metal, or composite material, and may be round or another shape in cross section. Semi-rigid rods 107a and 107b are preferably stiff enough to remain substantially straight when unstressed, to lightly resist bending, and to regain substantial straightness when any bending force is removed. In one example embodiment, rods 107a and 107b are each about 28 inches long and about ¼ inch in diameter, and are made of unreinforced plastic. Other appropriate sizes may be used.

First ends of both rods 107a and 107b follow a first leg 105a of canopy 102 to its connection with base pad 101. Preferably, rods 107a and 107b are embedded within edges of surface sheet 106, but other placements may be used. A second end of first rod 107a also follows second leg 105b to its connection with base pad 101, and a second end of second rod 107b follows third leg 105c to its connection with base pad 101. Rods 107a and 107b thus support canopy 102 by virtue of their stiffness, similar to the way a tent may be supported by tent poles.

As described in greater detail hereinafter with reference to FIG. 3A, a clip 301 is slidingly engaged with rod 107a. Clip 301 may slide anywhere along rod 170a to adjust the position of one or more toys that are coupled to clip 301.

This provides a convenient way for a caregiver to adjust the location of a toy relative to a child. For example, when removing the child from base pad 101, when changing a diaper or cleaning the baby, the caregiver can simply slide clip 301 along rod 107a to afford better access into the interior of the tent. To keep the child entertained, slip 301 may be slid such that the toy hangs over the arched support. Although shown attached to rod 107a, it will be appreciated that clip 301 may be coupled to any of the rods. Moreover, multiple clips could be attached to a single rod. Also, multiple toys may be chained together, such as toys 122 and 124 of FIG. 1A, to increase the length of the toy and provide a different arrangement for the toys that are suspended from base pad 101.

Base pad 101 may also include one or more tracks 130 that may be coupled anywhere along a top or side of base pad 101. Track 130 is a semi-rigid rod that may function similar to the rod 107a in supporting one or more clips 350 as described in greater detail hereinafter with reference to FIGS. 3C and 3D. As further illustrated in FIG. 1C, track 130 comprises a semi-rigid rod that is coupled to base pad 101 by a fabric sleeve 132. More specifically, sleeve 132 may comprise a fabric strip that has its lengthwise ends sewn into a seam 133 in base pad 101 to form a tube. Seam 133 is the seam that is formed when connecting portions 101a and 101b. The rod is slid through sleeve 132 and then the ends 136 and 138 of sleeve 134 are sewn down and incorporated into the seam. Prior to sewing the ends into the seam, clip 350 is inserted over the fabric sleeve. In the way, clip 350 will not detach from track 130. As another option, the ends of the rod may be held in pockets to secure the rod to base pad 101. In this way, a fabric sleeve would not be needed.

One or more toys 126 may be coupled to clip 350 in a manner similar to that described in connection with other embodiments. This allows items, such as toys to be removably coupled with base pad 101. Further, the location of the items can easily be adjusted by sliding them along track 130 using clip 350. For example, a toy can be moved to a mid portion of base pad 101 to provide easy access to the toy by the child. However, when the child needs to be removed from base pad 101, clip 350 may be slid to one side to move the toy. As another example, clip 350 may be slid along track 130 to place the toy in a different location to thereby provide a different environment within the play structure.

The fabric used to form fabric sleeve 132 should be durable because of friction caused by the slider clip when moving over the rod. The fabric should be sufficiently durable so that the rod will not break through the fabric over time. Preferable fabrics include nylon fabrics. An especially good fabric is a denier nylon with or without a polyurethane coating.

Figure 1B:
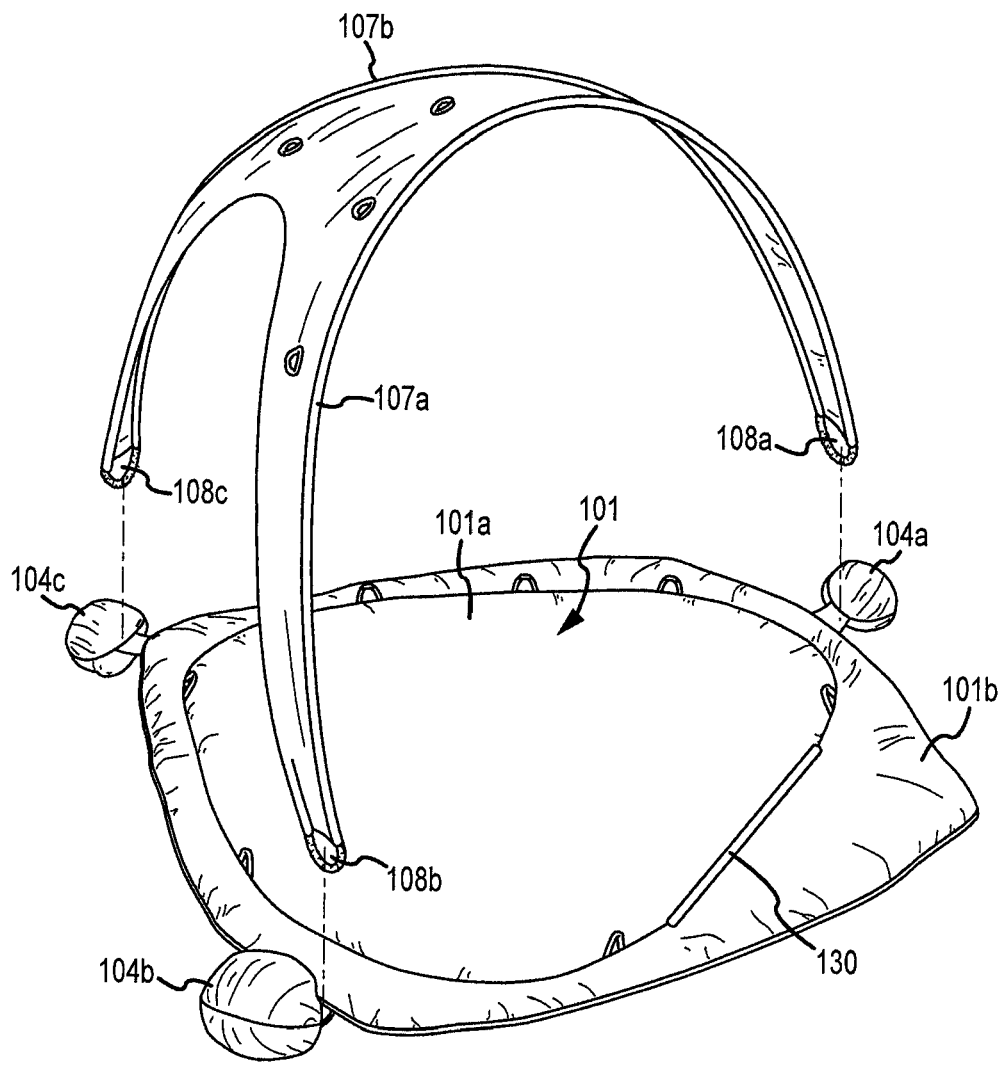
FIG. 1B shows the play gym of FIG. 1 with some of its parts separated, in accordance with embodiments of the invention.
Figure 1C:
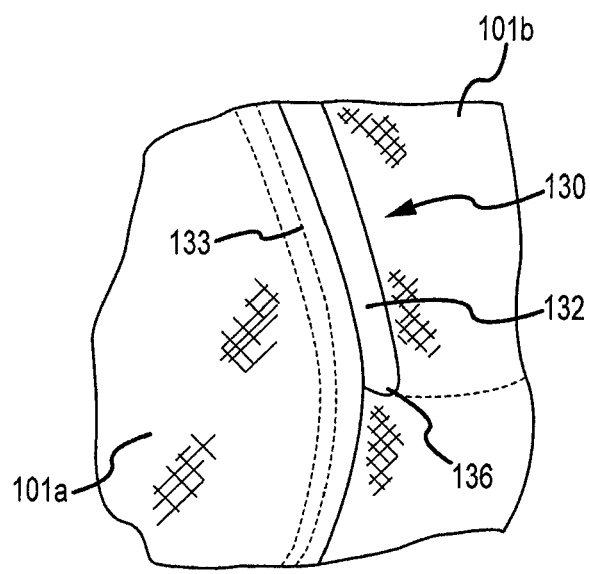
FIG. 1C is a magnified view of one end of a track of the play gym of FIG. 1A.

FIG. 1B shows canopy 102 separated from the rest of play gym 100. Canopy attachment loops 108a-c are placed at the lower ends of legs 105a-c. Loops 108a-c are configured to engage the attachment members 104a-c to attach canopy 102 to base pad 101. To make the attachment, each attachment member is passed through its respective loop. If attachment members 104a-c are compressible, each attachment member may be compressed to pass through its corresponding loop and then allowed to re-expand. Canopy attachment loops 108a-c may also be stretchable, so that when the loops are unstretched, the loops are smaller than the attachment members. This arrangement may help ensure a secure attachment of canopy 102 to base pad 101, but also allow for easy disassembly of play gym 100. As another option, loops 108a-c may each comprise two straps with ends having a hook and loop fastener material. In this way, the two straps may be wrapped about the attachment members 104a-c and then secured to each other about their respective ends.

Play gym 100 may comprise one or more openings for attaching items 103 to play gym 100. For example, surface sheet 106 may include spaced apart holes 109, which may be reinforced by stitching around the perimeter of the hole or by other means. In another example, base pad 101 or canopy 102 may include loops such as item attachment loops 110 shown in FIG. 1. These holes and loops may be used to attach various toys, such as, for example, the toy in FIG. 2. However, the holes and loops can also be used with traditional toy links, also referred to as "C" clips or "C" links, to which various items may be attached.

Figure 2:
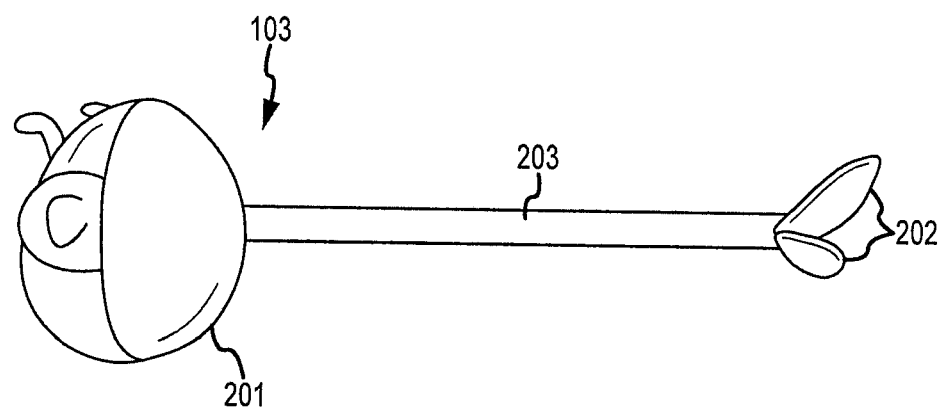
FIG. 2 shows an example item that may be attached to the play gym of FIG. 1.

FIG. 2 shows an example item 103 that may be attached to play gym 100. In this example, item 103 is a ball configured to attach to play gym 100, but many different kinds of items may be configured to attach to play gym 100, including such items as a toy, a block, a pyramid or other geometric shape, a doll, a teething ring, an item comprising a mirror, a toy shaped like an animal or insect, a toy shaped like a plant or flower, or another suitable item. Preferably, items attached to play gym 100 are selected to be entertaining and stimulating to an infant placed in play gym 100.

As is shown in FIG. 2, item 103 includes a main body 201 and a compressible member 202 connected to the main body 201. In this example, compressible member 202 is connected through tether 203, but other connection arrangements may be used. Compressible member 202 may have any suitable shape, such as a ball shape, a block shape, a pyramid shape or other geometric shape, a button shape, a leaf or flower shape, an animal shape, a shape reminiscent of wings, or another shape. The shapes may or may not incorporate sound, light or vibration features. Compressible member 202 is preferably somewhat larger in its uncompressed state than holes 109 or item attachment loops 110. Item 103 may then be attached to play gym 100 by squeezing compressible member 202 through one of holes 109 or item attachment loops 110 and allowing compressible member 202 to re-expand, providing a secure but easily removable connection. This attachment system has the additional advantage that the materials involved may be soft and pliable and all of the parts may be relatively large, resulting in a safe environment for the infant.

Figure 3A:
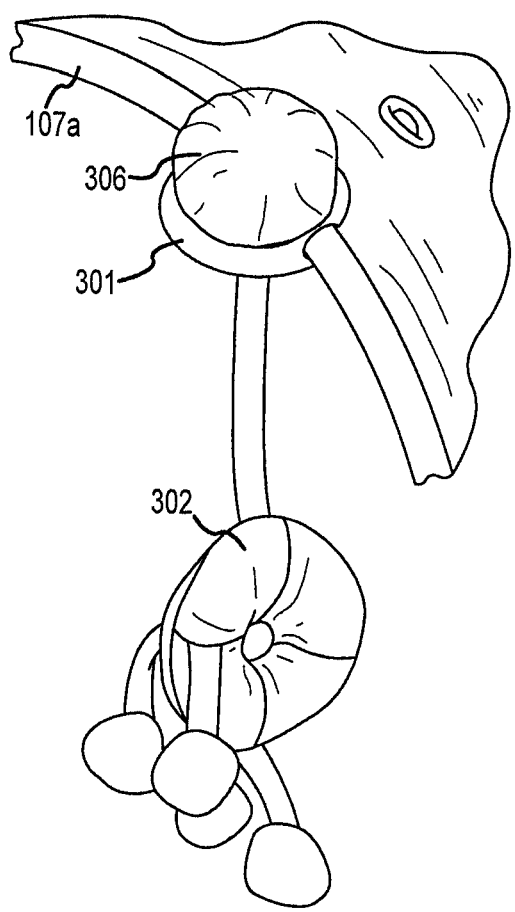
FIG. 3A illustrates an attachment of an item in accordance with another embodiment.

FIG. 3a illustrates another embodiment of an attachment of an item 302 to play gym 100. In this embodiment, clip 301 is slidingly engaged with rod 107a. One or more clips such as clip 301 may be engaged with any or all rods of canopy 102. Preferably, rod 107a is embedded in play gym 100 so that it is accessible for engagement with clip 301. For example, rod 107a may be embedded by wrapping rod 107a in a portion of surface sheet 106. In that configuration, rod 107a may be thought of as residing in a tubular pocket sewn into surface sheet 106. Not all of the rod need be wrapped or embedded. Even if part of a rod is wrapped, some of the rod may be left exposed. In some embodiments, the portion of surface sheet 106 wrapping rod 107a may be made of a woven nylon or other durable fabric, to provide a suitable amount of friction to clip 301, and to resist wear.

Figure 3B:
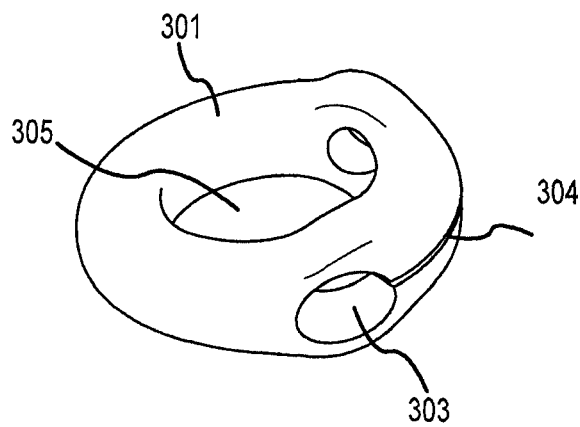
FIG. 3B illustrates a clip in accordance with embodiments of the invention.

FIG. 3b illustrates clip 301 in isolation. Clip 301 is generally toroidal, but need not be perfectly toroidal. A slotted passage 303 is provided at one side of clip 301. Slotted passage 303 is configured to slidingly engage a rod such as rod 107a. The rod and slotted passage may be any size, so long as passage 303 is sized so that clip 301 is easily slid along the rod, but will maintain its position on the rod when left at rest. This kind of sliding fit may be facilitated by the natural compliance of a portion of surface sheet 106 that may be wrapped around the rod, and by the split configuration of passage 303. Clip 301 is preferably substantially rigid so that it is not reasonably removable from the rod without sliding clip 301 past an end of the rod.

Once clip 301 is engaged with rod 107*a* (or another rod) the fabric or other material wrapping rod 107*a* may engage with slot 304 of passage 303, and limit the rotation of clip 301 around rod 107*a*. Hole 305 in clip 301 provides an opening configured for attaching items to play gym 100. For example, compressible member 306 of item 302 may be passed through hole 305 to hang item 302 from canopy 102. Multiple clips 301 may be provided on play gym 100, and one or more clips may be provided on any or all semi-rigid rods used to support a canopy. Any or all clips 301 mounted on canopy 102 may be easily moved to adjust the positions of items such as item 302 attached to canopy 102 using clips 301.

It will be appreciated that many variations are possible in the configurations of the items to be attached to a piece of child care equipment such as play gym 100.

For example, referring again to FIG. 1, item 111 may comprise a mirror surface (which may be surrounded by suitable padding) to allow the child to see a reflection of himself or herself. Item 111 also illustrates another variation. Item 111 includes two compressible members 112 and 113, which are passed through two of item attachment loops 110, to further constrain the position of item 111. In another example, item 302 shown in FIG. 3A has a main body in the shape of an animal. Other items may have main bodies shaped like insects, plants, flowers, geometric shapes, or other objects that may entertain or stimulate the child.

In some embodiments, an item attached to a piece of child care equipment may generate sound. For example, a ball or other item may be filled with a material that makes a crackling sound when the ball is squeezed, encouraging the child to interact with the item. An attached item could include an electronic sound generating device that plays music, animal sounds, tells a story, or generates some other kind of sound when the item is squeezed, caused to move, or otherwise activated. In addition, an item may also incorporate a light feature or a vibration feature which can be activated by movement or a switch, also encouraging the child to interact with the item.

Figure 3C:
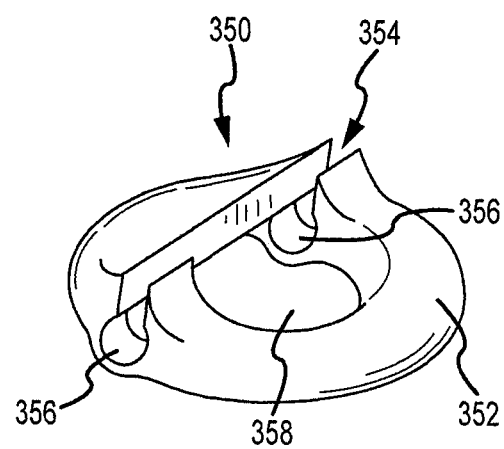
FIG. 3C is a bottom perspective view of an alternative clip according to the invention.
Figure 3D:
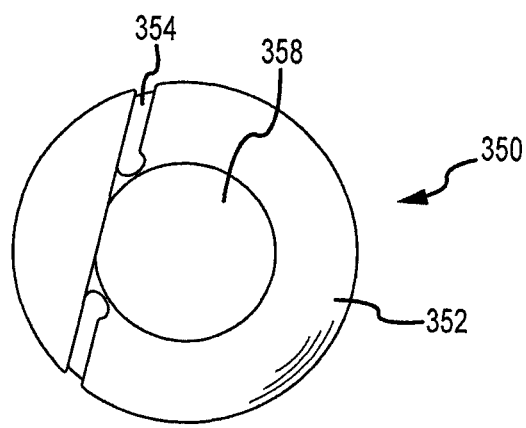
FIG. 3D is a bottom plan view of the clip of FIG. 3C.

FIGS. 3C and 3D illustrate clip 350 of FIG. 1A in greater detail. Clip 350 comprises a clip body 352 that is generally toroidal in geometry. Clip body 352 has a slot 354 leading to a passage 356 through which the rod will slide. Slot 354 is wide enough to prevent the fabric sleeve to slide through it. Passage 356 is sized to be just large enough so that it can smoothly slide over the rod and fabric sleeve. If passage 356 is too large, clip 350 will be too loose and will not easily slide, and may be able to separate from the rod. Conversely, if it is too small, then it will bind against the sleeve and/or rod making movement difficult. Thus, the rod should be small enough that it can be wrapped in the nylon fabric forming the sleeve and still have the clip slide, but not so small that the clip snaps off the rod and presents a safety hazard. The passage in clip 301 may be sized in a similar manner. Clip 350 also defines a central opening 358 where a compressible member of a toy may be placed similar to other embodiments described herein.

Another feature of clip 350 is that slot 354 is generally perpendicular to the clip body, while with clip 301 the slot 304 is parallel to the clip body. This permits clip 350 to be generally parallel to the base 101 as illustrated in FIG. 1A so that it does not stick up and interfere with the baby's play. With clip 301, the clip body is generally aligned with the fabric on the arched support. While the clip body does extend from the rod, this does not interfere with the baby's play and also allows the toy to more easily hang from the arched support. In some cases, clips may be constructed where the slot is at different angles relative to the clip body, such as 15 degrees, 30 degrees, 45 degrees, 60 degrees and the like, to permit the clip body to be at different angles relative to the adjacent fabric or base layer.

Many variations are also possible in the shapes of the compressible members used to attach items to the child care equipment. For example, compressible member 202 shown in FIG. 2 may be reminiscent of leaves, animal ears, or wings. Compressible member 306 shown in FIG. 3A is in a simple ball shape. Other possible shapes include a flattened ball or button shape, other geometric shapes, leaf and flower shapes or animal shapes.

Figure 4:
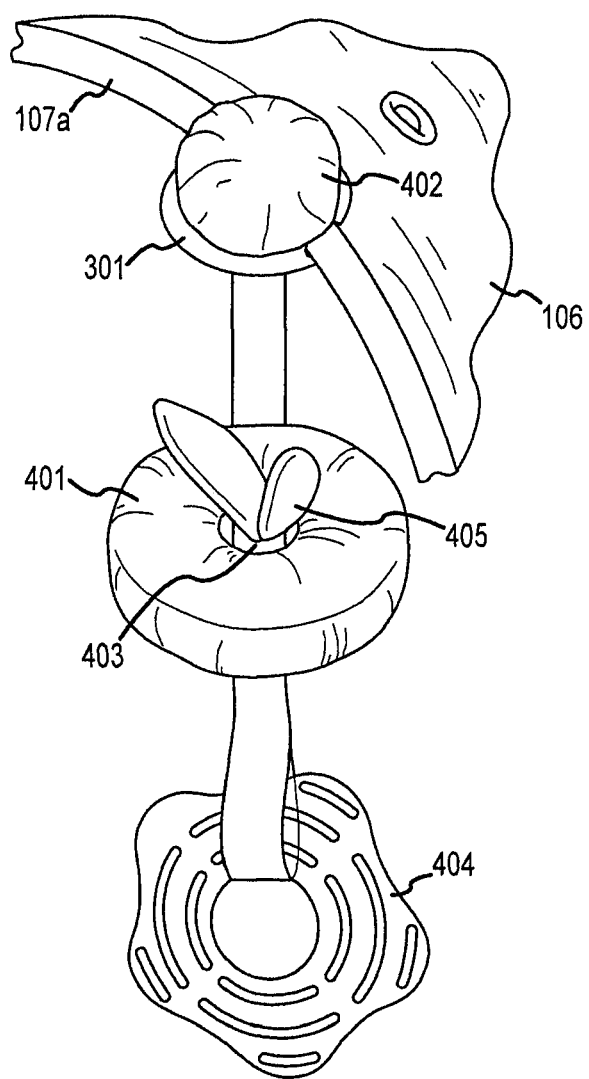
FIG. 4 shows an item attachment in accordance with another example embodiment.

FIG. 4 shows another example item 401 attached through a clip 301 engaged with rod 107*a*. In this example, item 401 includes a button-shaped compressible member 402 engaged with clip 301. The main body of item 401 is generally toroidal or donut shaped having an opening 403. A second item 404 is suspended from opening 403 in item 401. In this example, second item 404 includes a teething ring, and also includes a compressible member 405 in a shape reminiscent of leaves.

Attachment systems and methods according to embodiments of the invention may be used with a variety of child care equipment. Play gym 100 shown in FIG. 1A is but one example. Other kinds of equipment that may embody the invention include, without limitation, a play yard, a playpen, a swing, a baby bouncer, a shopping cart liner, a stroller, a car seat, a booster seat, a high chair, a play pad, a changing pad and a changing pad cover.

Figure 5:
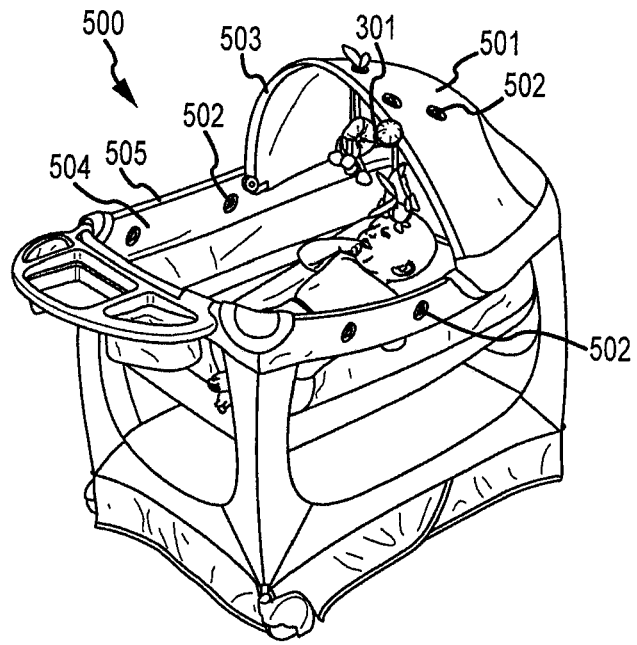
FIG. 5 shows a play yard in accordance with embodiments of the invention.

In one example, FIG. 5 shows a play yard 500 in accordance with embodiments of the invention. A play yard is a device similar to a traditional playpen, and is designed to provide a safe and constrained space for a child to spend time. A play yard may be placed, for example, in a corner of a room, or even outdoors when it is desired that the child accompany a group on a picnic or other outing. Play yard 500 includes features for attaching toys or other items. For example, play yard 500 includes a dome 501, which may include holes 502 for attaching items as previously described. An edge of dome 501 may include an embedded semi-rigid rod 503 and a clip 301 slidingly engaged with rod 503 for attaching items. Other portions of play yard 500 may also include openings or rods. For example, a wall or side 504 of play yard 500 may include holes 502, an embedded semi-rigid rod 505, or both; or the bottom of the play yard may include an embedded semi-rigid rod. Other examples of play yards or other play structures that may include such attachment systems are described in U.S. Pat. No. 7,290,303, and Published U.S. Application No. 2007/0271703 and 2002/0042953, incorporated herein by reference.

Figure 6:
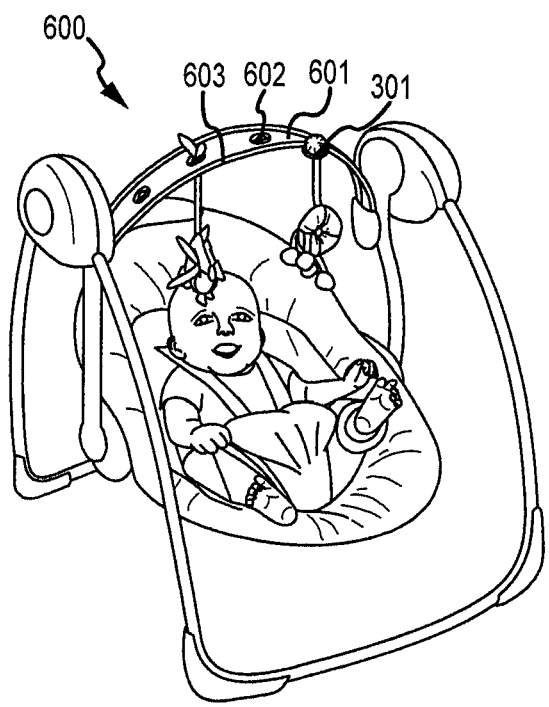
FIG. 6 shows a swing in accordance with embodiments of the invention.

In another example, FIG. 6 shows a swing 600 in accordance with embodiments of the invention. Example swing 600 includes an arched support frame 601 that includes holes 602 in a surface sheet and an embedded semi-rigid rod 603 for attaching items, for example using clip 301. Swing 600 may be used, for example, to provide a place for a baby to relax, with the swinging motion providing a comfort and enjoyment for the baby. The items suspended from arched support frame 601 provide additional entertainment and stimulation.

Figure 7:
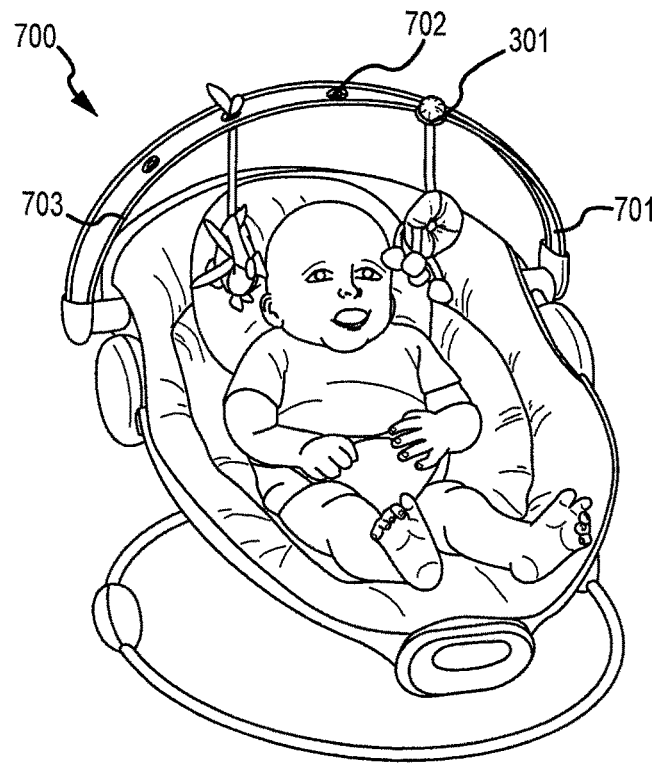
FIG. 7 shows a bouncer in accordance with embodiments of the invention.

FIG. 7 shows a bouncer 700 in accordance with embodiments of the invention. A bouncer is a device used in a manner similar to a swing, but provides a bouncing motion rather than a swinging motion. Bouncer 700 also includes an arched support frame 701 having holes 702 in a surface sheet and an embedded semi-rigid rod 703, for mounting items using a clip 301.

Figure 8:
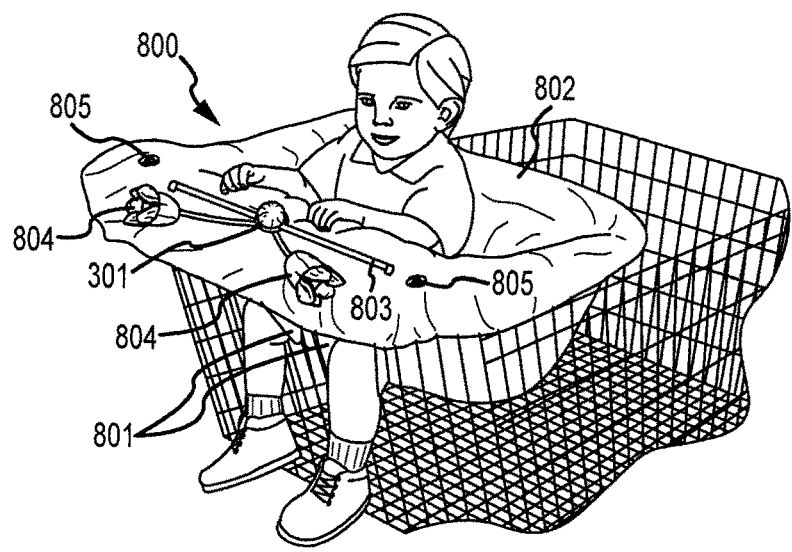
FIG. 8 shows a shopping cart liner in accordance with embodiments of the invention.
Figure 8A:
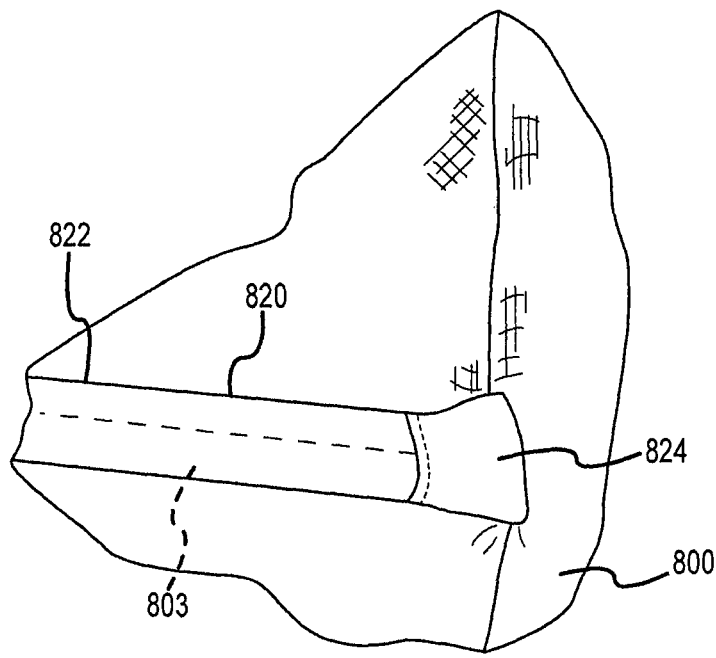
FIG. 8A is a magnified view of one end of a track of the cart liner of FIG. 8.

FIG. 8 shows a shopping cart liner 800 in accordance with embodiments of the invention. Shopping cart liner 800 is configured to nest in the child seat portion of a shopping cart to provide a clean liner over unsanitary surfaces. Liner 800 also provides protective soft surfaces for a child to encounter, rather than the hard, cold materials of which the shopping cart itself is usually made. Similar liners may be constructed for strollers, child car seats, high chairs, booster chairs, or other items in which a child may be placed, and one of skill in the art will recognize that the attachment features of shopping cart liner 800 may be adapted to other kinds of liners as well. Shopping cart liner 800 includes leg holes 801 and a padded shell 802. A rod 803 is embedded in a portion of shopping cart liner 800 that a child faces when the liner is in use. As in other embodiments, rod 803 may be embedded by wrapping it in a fabric sleeve 820 or other sheet sewn into shopping cart liner 800, or may be embedded in some other way. As illustrated in FIG. 8A, fabric sleeve 820 is sewn into a seam 822 of liner 800 such that it forms a tube into which rod 803 may be inserted. After inserting rod 803 into the sleeve, each end 824 of the sleeve is folded back and then sewn onto itself as well as to the liner 800 as illustrated in FIG. 8A. Alternatively, an additional piece of fabric can be sewn over the ends and to the liner to insure that the ends of rod 803 will not poke through the sleeve. A clip 301 is slidingly engaged with rod 803, and toys or other items 804 are attached to shopping car liner using compressible members passed through the hole in clip 301. Typically, slider clip 301 is inserted over rod 803 and sleeve 820 prior to sewing ends 824 back on themselves to insure that clip 301 will remain attached to rod 803. In this example, both items 804 are shaped like flowers, and both are attached through the same opening in clip 301. Shopping cart liner 800 may also have holes 805 through which other items may be attached using the methods described above. When attached to shopping cart liner 800, items 804 provide entertainment and stimulation to a child riding in the shopping cart, and because they are attached, are not likely to be dropped or lost.

Figure 9:
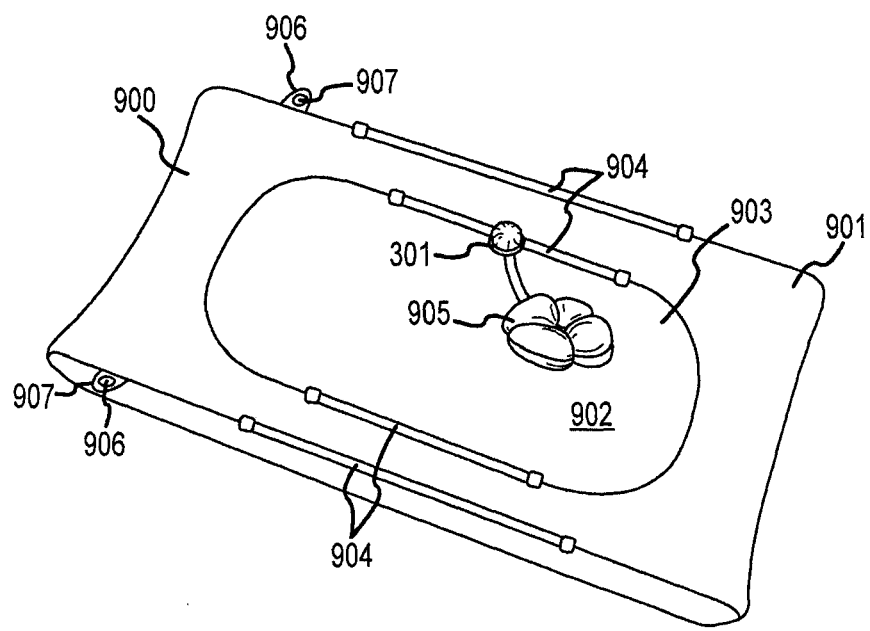
FIG. 9 shows a changing pad in accordance with embodiments of the invention.

FIG. 9 shows a changing pad 900 in accordance with embodiments of the invention. A changing pad is a soft pad of a convenient size and shape for holding an infant while its diaper is changed. Example changing pad 900 includes a cover 901 stretched over the outer surface of pad 900 in a manner similar to a fitted sheet over a mattress. Optionally, a protective liner 902 may be placed on top of cover 901. This may be constructed of a waterproof material to protect pad 900. Changing pad 900 also includes features for attaching items in accordance with the systems and methods described above. For example, one or more rods 904 may be embedded in various seams of cover 901, either at interior seams around opening 903 or at outer edges of changing pad 900. Rods 904 may encompass only a portion of a particular seam, as is shown in FIG. 9, or may encompass all of one or more seam. Rods similar to rods 904 may be embedded in other ways in changing pad 900 as well. Preferably, at least one clip 301 is slidingly engaged with each embedded rod. (Only one clip 301 is shown in FIG. 9 for clarity.) Items such as item 905 may be attached through the holes of any or all of the clips, as described previously. Changing pad 900 may also include tabs 906 protruding from cover 901 and having holes 907, providing additional or alternative attachment sites. Other kinds of pads, for example play pads, may be used in child care, and one of skill in the art will recognize that attachment features described above in relation to changing pad 900 may be adapted for use in other kinds of pads as well.

In some embodiments, an arch or an arm may be suspended over the changing pad in a manner similar to the play yards, swings and bouncers described herein. This arch or arm may include a flexible semi-rigid rod as in other embodiments to which a slider clip may be attached. In this manner, various items may be suspended over the changing pad. It could also include holes or loops through which the toys described herein may be attached.

The slider clips, rods, tracks, as well as the openings and loops for receiving compressible toys that are described herein may be incorporated into a variety of other products, such as on a crescent shaped pillow, including those described in U.S. Pat. Nos. 5,261,134; 5,661,861; 6,038,720; 6,055,687; 6,685,024; 6,434,770; 6,671,908; 7,017,212; 6,279,185; 6,412,128; 7,451,508; 7,127,760; 6,944,898; 7,587,773; 7,472,443; and 7,404,222, incorporated herein by reference, and on slipcovers, including the slipcovers described in U.S. Pat. No. 6,453,493; U.S. Pat. No. 6,625,828; U.S. Pat. No. 6,851,143; U.S. Pat. No. 7,000,274; and U.S. Pat. No. 7,146,663, incorporated herein by reference. As another example, the attachment systems described herein may be used to attach items such as a pacifier, a pocket (such as to hold a cell phone or bottle), or the like to a large piece of equipment. As further examples, the attachment systems described herein may be used in connection with other equipment such as a walker, a jumper (that hangs in a doorway with elastic straps hooked onto a seat so baby can jump up and down), a pram or stroller, a baby exerciser or rocking saucer (like those sold by Evenflo and ExerSaucer), a baby activity center (such as those similar to the ExerSaucer, but without the saucer-shaped bottom), a toddler chair, a bassinet or crib, a crib mobile (having the slider system and/or holes in the mobile canopy), a crib bumper, a car seat organizer (such as a pocket organizer which fits over the back of the front seat), a storage basket, a storage bin or toy chest, a diaper bag, a baby carrier, including front or back baby carriers, a baby sling, an infant bath tub, a bath tub infant seat or a bath tub accessory with a suction cup, a baby bib, a book for baby (where the slider clip may be incorporated into the spine of the book or across the cover), a rocking chair, a glider chair, or the like.

Figure 10:
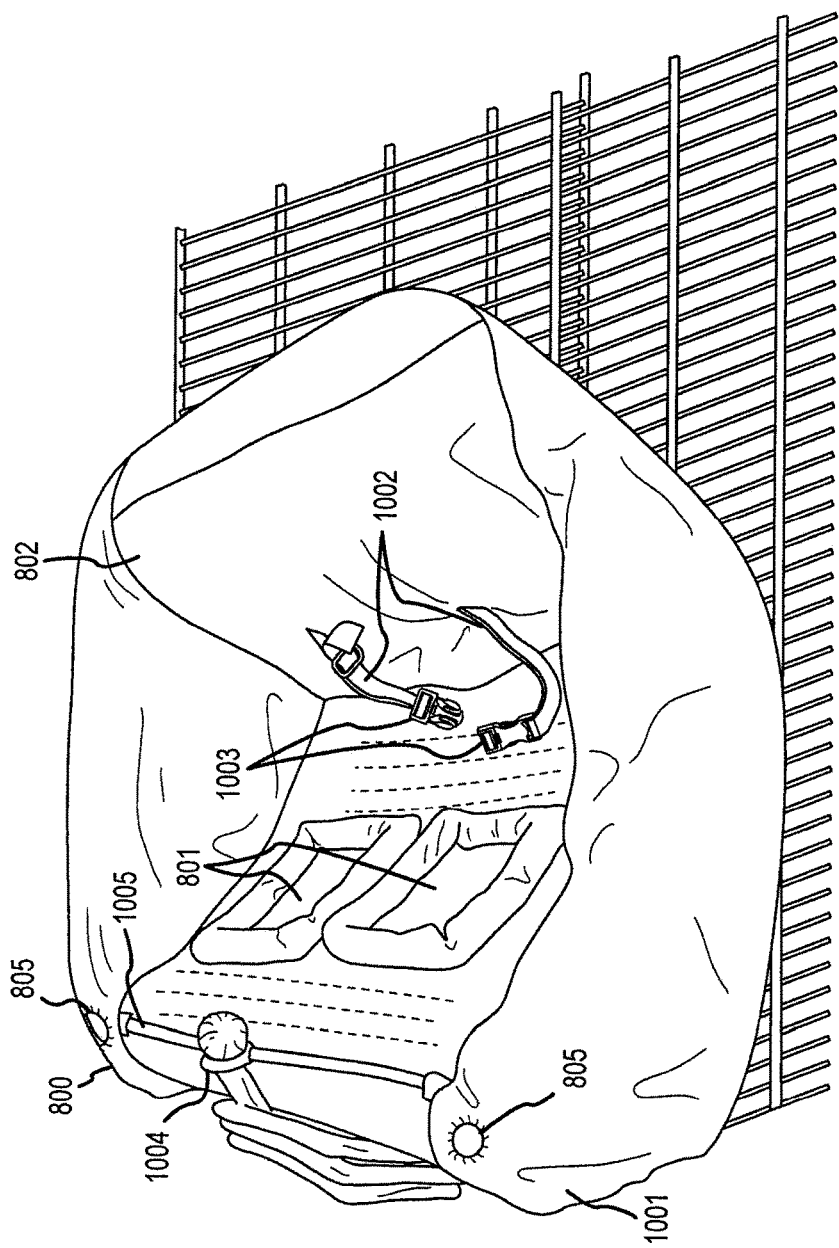
FIG. 10 illustrates an interior view of the shopping cart liner of FIG. 8, and illustrates additional features that may be present in some embodiments.

FIG. 10 illustrates an interior view of example shopping cart liner 800, and illustrates additional features that may be present in some embodiments. Shopping cart liner 800 includes a body 1001 configured to nest in the child seat portion of a shopping cart. Shopping cart liner 800 or a similar liner could also be used in a high chair or similar chair, for example a chair of the kind often provided by restaurants for seating children at table height. The body 1001 may be made of a fabric or other similar material that is flexible and can conform to the shape of the shopping cart while being comfortable and safe for a child seated in shopping cart liner 800. Preferably, body 1001 is made of a washable material. Examples of suitable materials for body 1001 include cotton, nylon, LYCRA, denim, polyester, microfibers, synthetics, and the like. Body 1001 may be padded, for example using a batting or foam, which is also preferably washable. In some embodiments, body 1001 may include two layers of fabric or other flexible material with padding between the layers. For example, a batting or other padding material could be quilted into shopping cart liner 800. A track 1005 is embedded in shopping cart liner 800 and positioned near the handle by which a shopper would push the shopping cart. (The handle is not visible in FIG. 10, but is generally under track 1005 and is covered by shopping cart liner 800.) Track 1005 may be in the form of rod 803 as described above, and may be wrapped in a fabric sleeve 820, which may be sewn into a seam 822 of shopping cart liner 800, or may be embedded in another way. The ends of track 1005 may be captured in the manner described above and shown in FIG. 8A.

In other embodiments, track 1005 may be made of foam, plastic, or rubber welt material. Welt is an elongate flexible material, often circular in cross section, and is available from National Bias Binding Corp. of 140 58$^{th}$ Street 2L, Brooklyn, N.Y. 11220, among other suppliers. One advantage of using foam, plastic, or rubber welt to form track 1005 is that it is machine washable. Being substantially flexible, it may also be configurable into complex curves and other shapes, and may permit the item in which it is embedded to be folded, rolled, or otherwise reduced in size for packing or storage. It may be possible to sew directly across a track made of foam, plastic, or rubber welt, and when a track made of such a welt is embedded in a seam of a product, the ends of the track may be captured by simply turning the track through the seam and sewing across the track. This technique is explained in more detail below.

Openings or leg holes 801 are positioned to enable the feet of a child seated in the shopping cart to protrude through the body 1001 when the child is seated in the lined seat portion of the shopping cart.

A clip 1004 is slidingly engaged with track 1005. Clip 1004 defines an opening for attaching an item to the shopping cart liner. Clip 1004 may be similar, for example, to clip 301 or clip 350 shown in FIGS. 3B and 3C. Any suitable item may be attached to the shopping cart liner via clip 1004, for example, a toy, teething ring, doll, pacifier, or other item may be attached, by the methods described above. While only one clip 1004 is illustrated, it is to be understood that multiple similar clips could be engaged with track 1005. One or more holes 805 may be provided in body 1001 for attaching other items to shopping cart liner 800. Holes 805 may be formed, for example, similar to buttonholes, with dense stitching around the perimeter of the hole to lend strength and durability.

Shopping cart liner 800 may also comprise a seat belt 1002 affixed to body 1001 or another part of shopping cart liner 800, for securing a child to shopping cart liner 800. Seat belt 1002 may include a fastener 1003, which may be a buckle, snap feature, or other kind of suitable fastener. Fastener 1003 may be selected to be secure when fastened but still relatively easily disengaged by an adult. Seat belt 1002 may be fixed to shopping cart liner 800, for example by stitching. Preferably, though, seat belt 1002 is not fixed to shopping cart liner 800, but threads through openings in the liner such that one or both ends of seat belt 1002 can be threaded through or around bars or other features of the shopping cart and then the ends of seat belt 1002 connected, to secure both shopping cart liner 800 and the child to the shopping cart. In another embodiment, shopping cart liner 800 may not include a seat belt 1002, but may include openings positioned so that an existing safety strap that is part of the shopping cart could be threaded through the liner openings and around the child.

Figure 11:
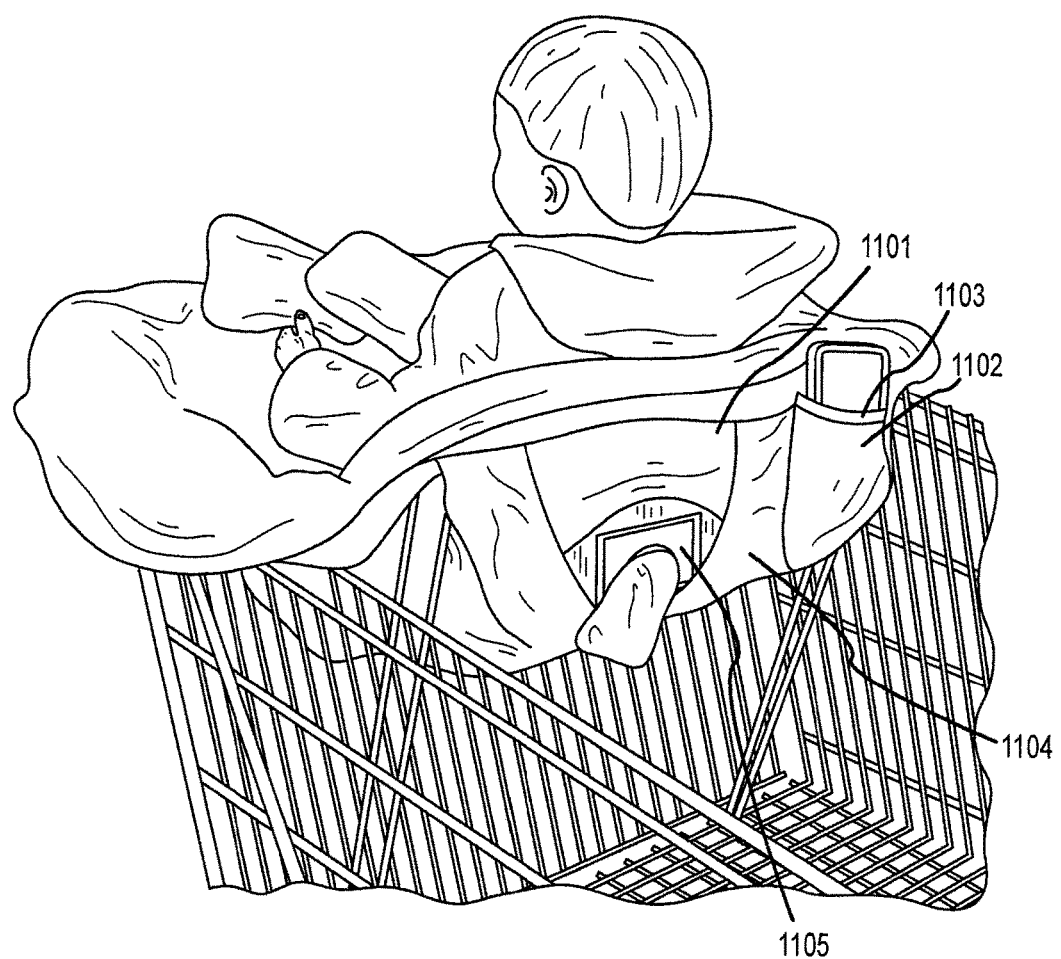
FIG. 11 shows a rear view of the shopping cart liner of FIG. 8, in use according to embodiments of the invention.

FIG. 11 shows a rear view of shopping cart liner 800 in use. A rear flap 1101 may hang down from the back of the seat portion of the shopping cart, and may include other features for the convenience of the user. For example, one or more pockets 1102 may be sewn into rear flap 1101 for holding items that a caregiver may wish to keep readily accessible, for example a baby bottle, cellular telephone, or other item. A pocket such as pocket 1102 may include an elastic rim 1103, for holding items more securely. A specialized pocket 1104 may be specially constructed to hold a package or dispenser 1105 holding tissues or wipes, leaving the package or dispenser 1105 partially exposed so that tissues or wipes can be dispensed easily. For example, pocket 1104 may be made of a set of partially-overlapping fabric flaps that constrain the edges of package or dispenser 1105 while leaving the center of package or dispenser exposed. One or more flaps similar to rear flap 1101 may be provided at the front of shopping cart liner 800, or on either or both sides of the shopping cart liner 800, and may include pockets or other features of convenience to the user.

Figure 12:
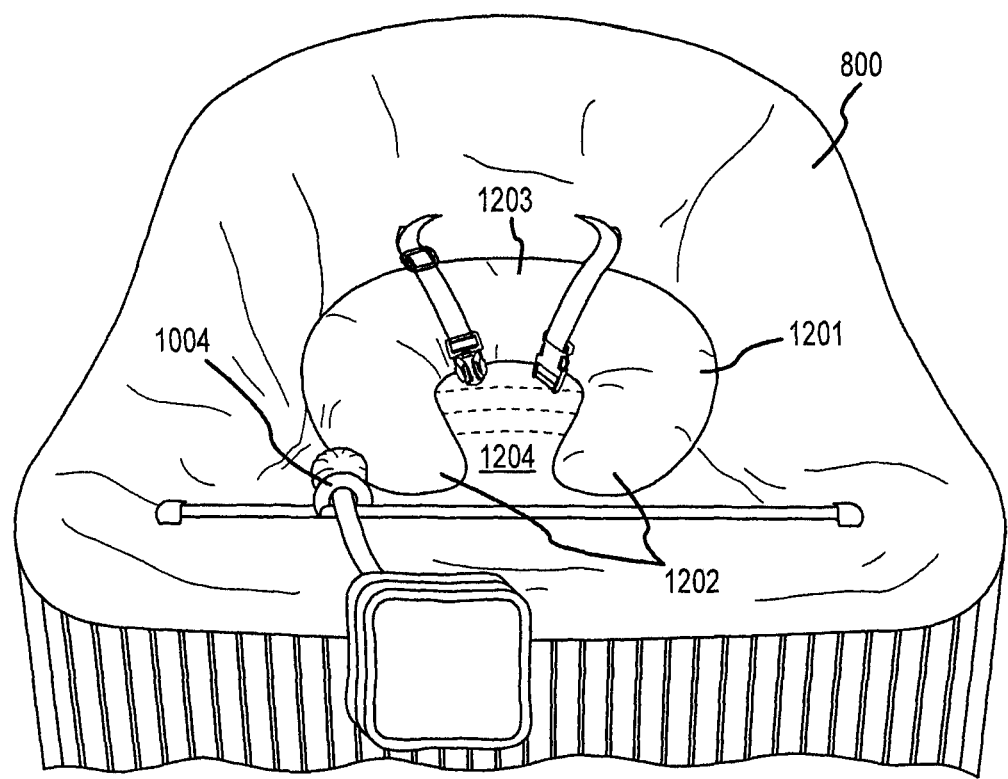
FIG. 12 shows an interior view of the shopping cart liner of FIG. 8, used in combination with a pillow in accordance with embodiments of the invention.

FIG. 12 shows an interior view of shopping cart liner 800, used in combination with a pillow 1201. Pillow 1201 may be generally arc shaped, including two curved arms 1202 extending from a midsection 1203, to define an open well 1204 to receive a child. Pillow 1201 may be between about 12 and about 20 inches wide, and is preferably about 16 inches wide. Open well 1204 may be between about 5 and 8 inches across, and is preferably about 6 inches across.

Pillow 1201 may be especially suitable for using shopping cart liner 800 with a very small child, such as an infant. Pillow 1201 may be placed in the lined seat portion of the shopping cart prior to or after seating the child. Once pillow 1201 and the child are in place, pillow 1201 may fit around the child's waist to support the child in an upright seated position. Pillow 1201 may be a small version of a pillow such as is described in one or more of U.S. Pat. Nos. 5,261,134, 5,661,861; 6,038,720; 6,055,687; 6,685,024; 6,434,770; 6,671,908; 7,017,212; 6,279,185; 6,412,128; 7,451,508; 7,127,760; 6,944,898; 7,587,773; 7,472,443; and 7,404,222, previously incorporated by reference.

Features may be provided on pillow 1201, shopping cart liner 800, or both for securing pillow 1201 to shopping cart liner 800. For example, pillow 1201 may include a fabric loop sewn or otherwise formed in the back of midsection 1203, and shopping cart liner 800 may include a tie sewn or otherwise formed near the bottom and back of the seating area of shopping cart liner 800. Such a tie could be made of a fabric or other material similar to the material the shell of shopping cart liner 800 is made of. The tie could be threaded through the loop and tied to hold pillow 1201 in place, and can easily be undone to allow pillow 1201 to be removed. The positions of the loop and tie could also be reversed, with the loop being part of shopping cart liner 800 and the tie being part of pillow 1201. Other kinds of connections are also possible. For example, a loop, tab, or other feature including the "hook" portion of a hook and loop fastener may be fixed to either pillow 1201 or shopping cart liner 800, and a feature including the "loop" portion of the fastener fixed to the other, so that pillow 1201 could be attached to shopping cart liner 800 by engaging the hook portion and the loop portion.

In some embodiments, shopping cart liner 800 may be used or provided in combination or conjunction with other accessories useful to a user of shopping cart liner 800. For example, a shopper who is caring for a child seated in shopping cart liner 800 may wish to carry items to attach to shopping cart liner 800, as well as other items such as diapers, clothing for the child, or other items useful during a trip to a store. Accordingly, shopping cart liner 800 could be paired with a tote bag or other accessory. A shoulder bag or other tote may conveniently be made of materials similar to body 1001 of shopping cart liner 800, and may form a matching companion piece to shopping cart liner 800. Such a bag may also provide a convenient way to carry pillow 1201.

Figure 13A:
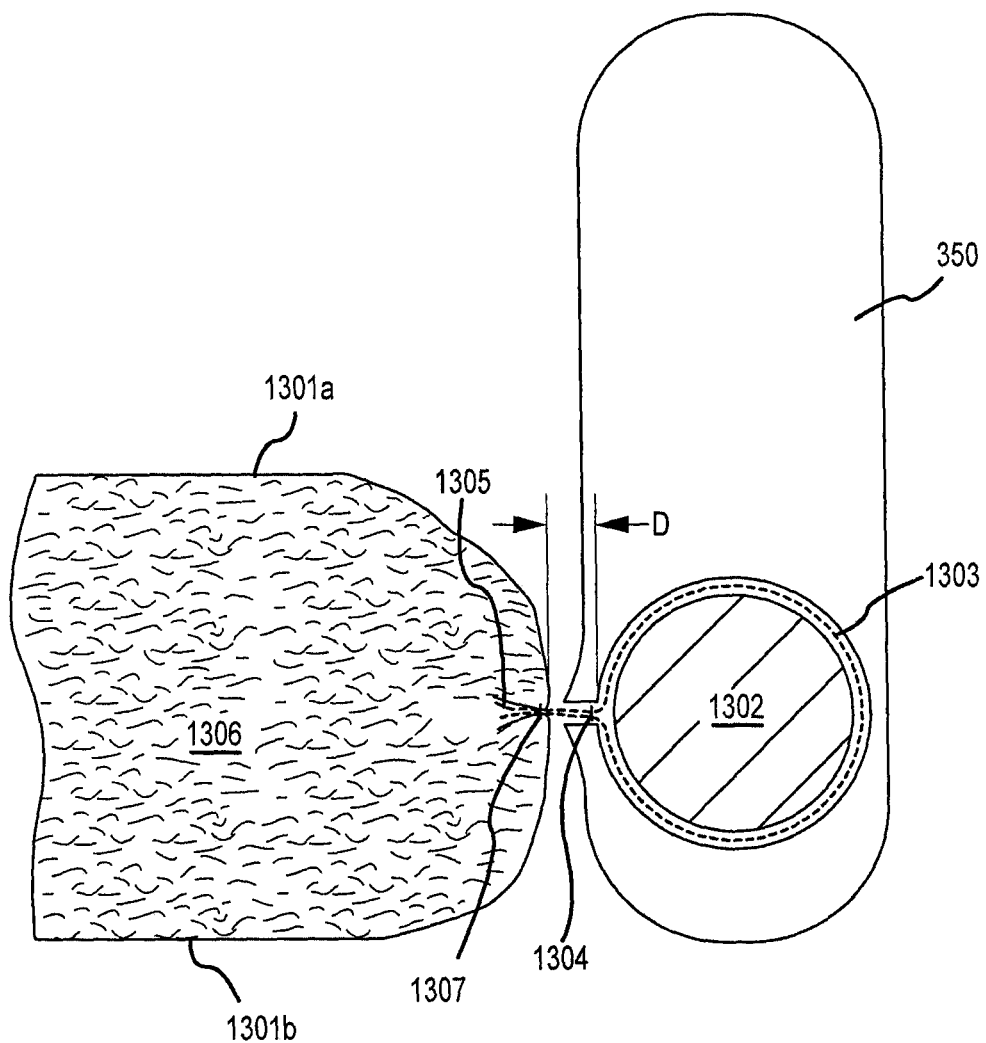
FIGS. 13A-13C illustrate embodiments of attaching a track at a seam of a piece of child care equipment.
Figure 13B:
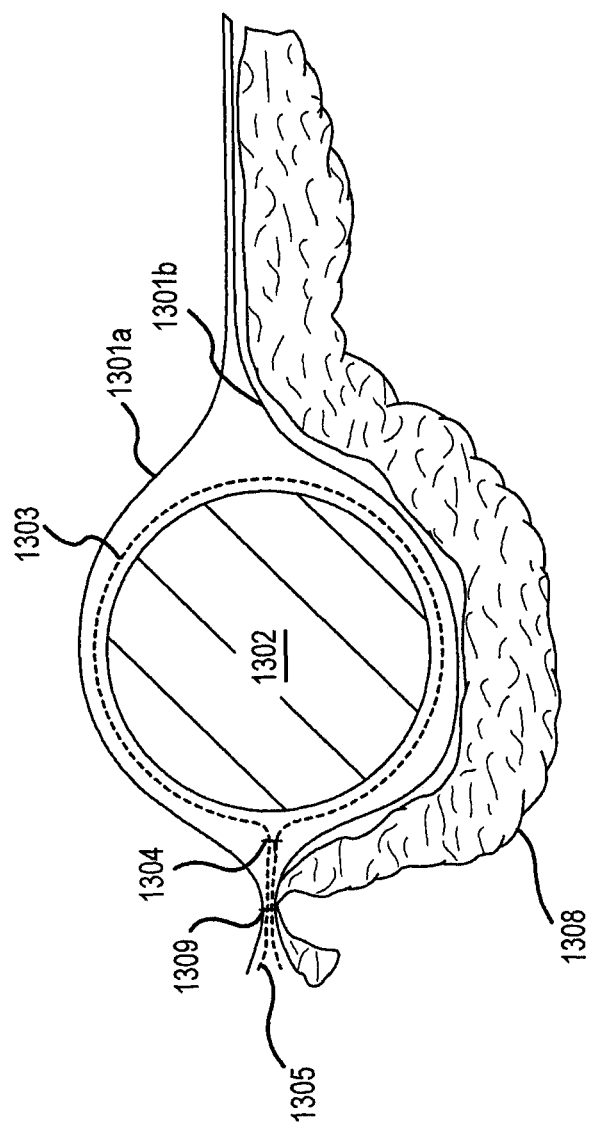
Figure 13C:
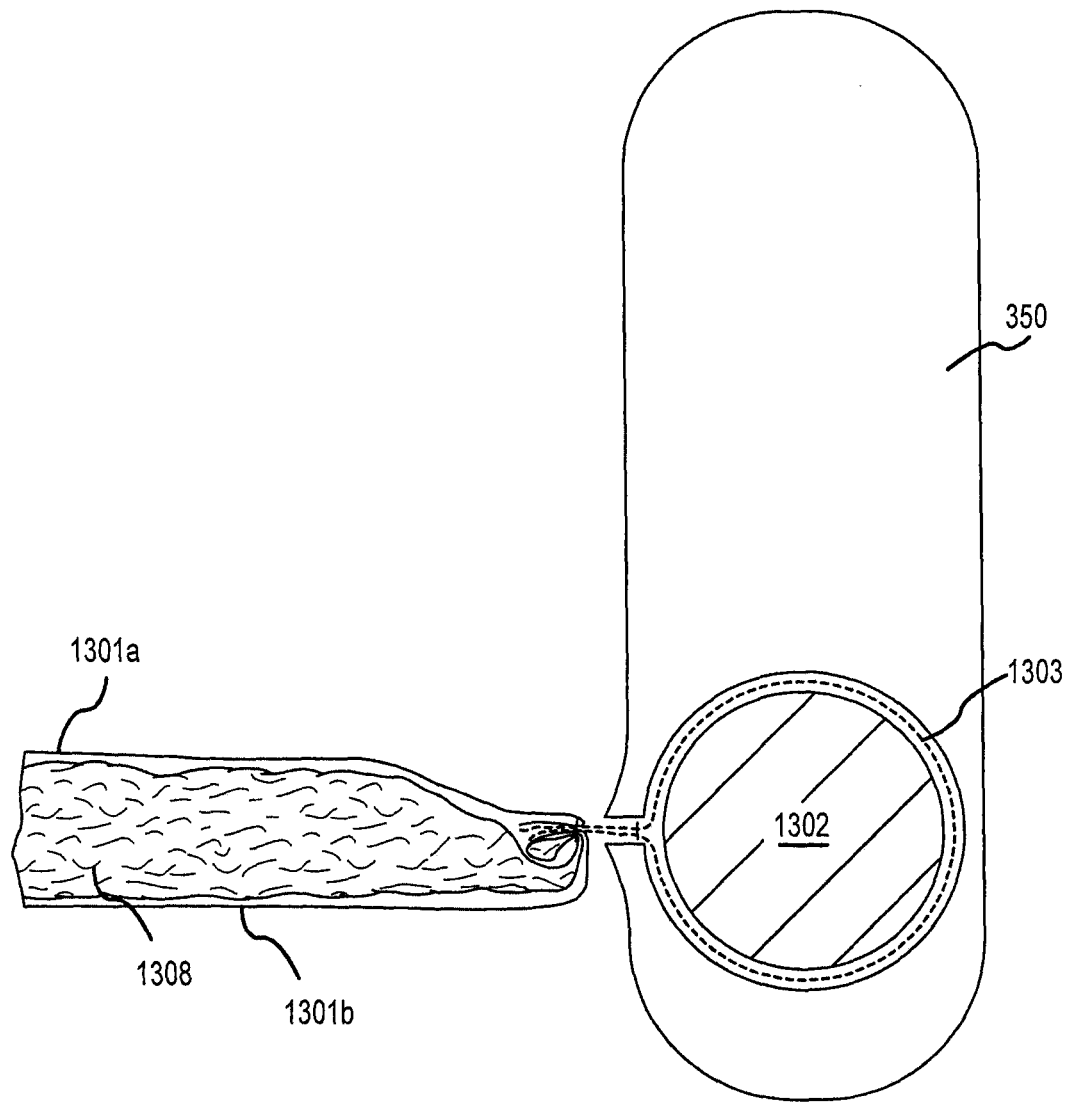
Figure 14:
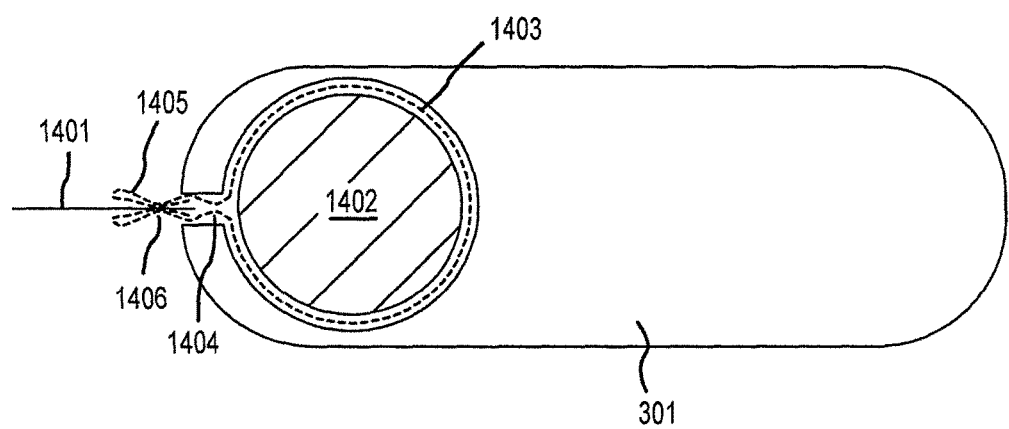
FIG. 14 illustrates an embodiment of attaching a track at an edge of a single-thickness piece of child care equipment.
Figure 15:
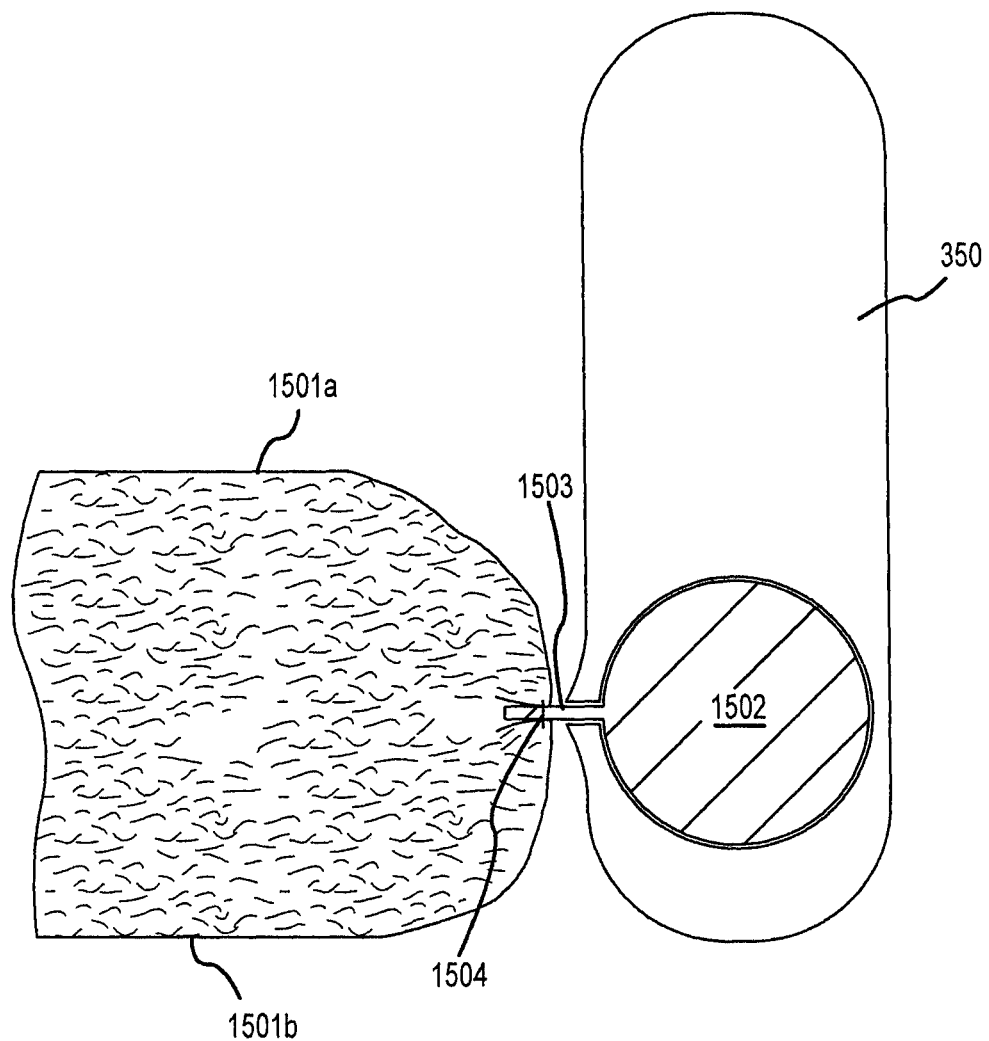
FIG. 15 shows another way of attaching a track to a piece of child care equipment, in accordance with embodiments of the invention.

FIGS. 13-15 illustrate additional details of how a track may be attached to a piece of child care equipment, for example shopping cart liner 800.

FIG. 13A shows one way of attaching a track at a seam in a piece of child care equipment having a shell with two layers 1301a and 1301b. In this view, a rod or welt 1302 is shown in cross section, and serves as a track. For example, welt 1302 may be made of extruded, foam, plastic, or rubber. Rod or welt 1302 is wrapped in a sleeve 1303, shown in dashed lines. As is described above, sleeve 1303 may be made of a material having good durability and strength, for example nylon or another suitable material. Preferably, sleeve 1303 is sewn along stitching line 1304 to snugly capture rod or welt 1302 within sleeve 1303, leaving two layers of sleeve 1303 protruding to form a tab 1305.

In this example, the shell is made in two layers 1301a and 1301b, with a padding or fill material 1306 between them. During construction, the edges of layers 1301a and 1301b may be generally aligned with the edge of tab 1305, and the four thicknesses of materials (layers 1301a and 1301b, and two thicknesses of sleeve 1303) sewn together along stitching line 1307. It may be convenient to make the attachment of sleeve 1303 to the shell with the shell "inside out". Once the shell is nearly complete, it may be turned "outside out" and filled with padding or fill material 1306. In this way, any edges of layers 1301a and 1301b and sleeve 1303 that might be subject to fraying are inside the finished product. A clip 350 or other clip according to embodiments of the invention may be engaged with rod or welt 1302, and the ends of sleeve 1303 addressed to capture rod 1302 longitudinally. Alternatively, rather than sewing sleeve 1303 and layers 1301a and 1301b together in a single operation, rod or welt 1302 wrapped in sleeve 1303 may be sewn to either layer 1301a or 1301b in one operation, and then to the other layer in a later operation, so that there may be three stitching lines at a particular seam.

Rod or welt 1302 is preferably spaced from the body of the child care equipment by a distance D that is sufficient to enable clip 350 to slide freely without catching on layer 1301a or layer 1301b. For example, spacing D may be about 1/16 inch to about 1/4 inch, or more preferably about 1/8 inch to about 3/16 inch.

FIGS. 13B and 13C show another way of attaching a track to a piece of child care equipment, in accordance with other embodiments of the invention. The technique of FIGS. 13B and 13C may be especially useful for construction of items that are generally flat but include padding, for example play pads, liners for shopping carts or strollers, or other similar items.

In FIG. 13B, a rod or welt 1302 has been previously wrapped in sleeve 1303 and sleeve 1303 sewn along stitching line 1304 to capture rod or welt 1302. Shell layers 1301a and 1301b are then stacked together with tab 1305 of sleeve 1303. In addition, a layer of sheet batting or other padding 1308 is also stacked together with tab 1305 and shell layers 1301a and 1301b. In this configuration, the sides of layers 1301a and 1301b that will form the outside of the product are facing each other. The combined shell layers 1301a and 1301b, tab 1305 of sleeve 1303, and padding 1308 are stitched together along stitching line 1309, which may extend along a portion or nearly all of the perimeter of the product. The stitching operation is preferably done with the product "inside out", and a small portion of the perimeter of the product is left unsewn, to allow for turning the product "outside out".

FIG. 13C shows the arrangement of layers once the product is turned "outside out" and a clip 350 is attached. The small previously unsewn portion of the product perimeter may then be finished with outside stitching or other finishing. A clip such as clip 350 is assembled onto the track at any suitable stage of the process, but preferably before the ends of the track are fully finished.

FIG. 14 shows one way of attaching a track at an edge of a piece of child care equipment having a single layer of material 1401. In this view, a rod or welt 1402 is shown in cross section, and serves as a track. Rod or welt 1402 is wrapped in a sleeve 1403, shown in dashed lines. Preferably, sleeve 1403 is sewn along stitching line 1404 to snugly capture rod or welt 1402 within sleeve 1403, leaving two layers of sleeve 1403 protruding to form a tab 1405. Each of the two layers of tab 1405 may then be folded under, and the single layer of material 1401 inserted between them, and the five resulting layers of material sewn together along stitching line 1406. In this way, any edges of material 1401 or sleeve 1403 that might be subject to fraying are captured and hidden within tab 1405, between stitching lines 1404 and 1406. Alternatively, sleeve 1403 could be made of a self-edged material, and material 1401 simply sewn between the two thicknesses of tab 1405, leaving the edges of sleeve 1403 exposed. A clip 301 or other clip according to embodiments of the invention may be engaged with rod or welt 1402, and the ends of sleeve 1403 addressed to capture rod or welt 1402 longitudinally. It will be recognized that this technique could also be used to attach a track at an edge of a piece of child care equipment having multiple layers capable of being captured within tab 1405.

FIG. 15 shows another way of attaching a track to a piece of child care equipment having a shell with two layers 1501a and 1501b. In this view, a welt 1502 is shown in cross section, and serves as the track. Welt 1502 is extruded, for example of foam, plastic, or rubber, to include an integrally formed flange 1503. Flange 1503 may be used to attach welt 1502 to layers 1501a and 1501b by sewing flange 1503 into the seam between layers 1501a and 1501b. The sewing may be done simultaneously, such as along stitching line 1504 capturing layers 1501a and 1501b and flange 1503 in a single pass, or flange 1503 may be sewn to the layers one at a time. Flange 1503 enables welt 1502 to be attached without being wrapped in a sleeve. The main portion of welt 1502 (to which flange 1503 is connected), could be hollow, for example forming a tube with an opening along its length, or may be fully formed of the welt material, without any hollow portion. It will be recognized that welt 1502 having flange 1503 could also be attached to a single layer shell, or to a multiple-layer shell with both layers on the same side of flange 1503. Many other configurations are possible. Welt 1502 having a flange 1503 may replace a sleeve-wrapped welt or rod in any suitable application, for example the applications shown in any of the Figures.

Figure 16A:
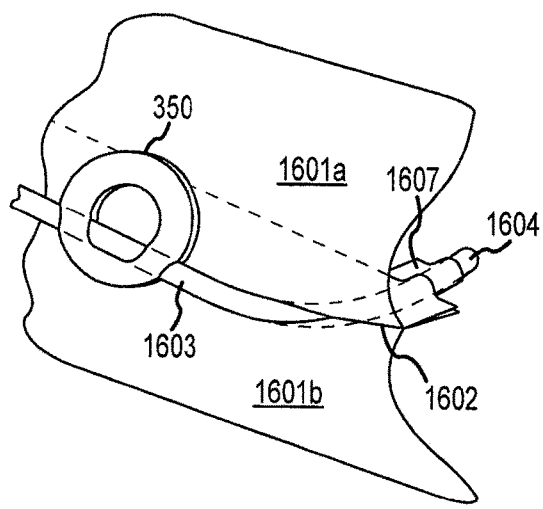
FIGS. 16A and 16B show a way of capturing the ends of a piece of welt in a seam, in accordance with embodiments of the invention.
Figure 16B:
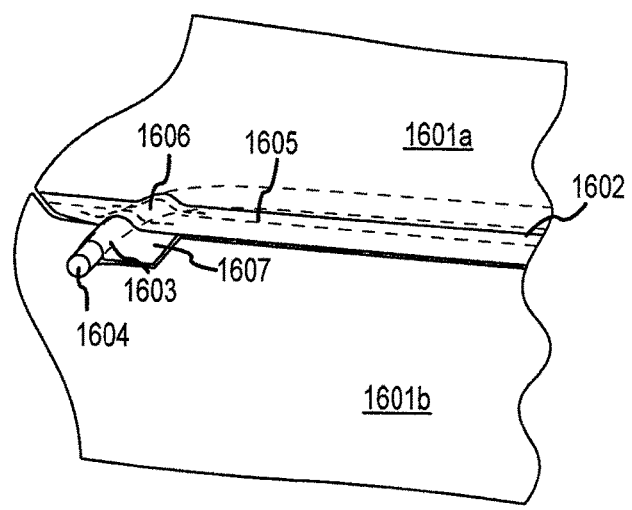

FIGS. 16A and 16B show a way of capturing the ends of a piece of welt in a seam between two fabric or other flexible layers 1601a and 1601b. FIG. 16A shows the assembly from the finished side of the seam, such as the outside of a product, and FIG. 16B shows the assembly from the unfinished side of the seam, such as would be found on the inside of a product. Layers 1601a and 1601b are joined along seam 1602. For much of the seam visible in FIGS. 16A and 16B, a track 1603 is sewn into seam 1602, for example by wrapping a piece of welt in a fabric sleeve 1607 and sewing the sleeve into seam 1602 as described above. At a point where it is desired that track 1603 ends, track 1603 is turned inward, so that end 1604 of track 1603 will reside inside the finished product. Stitching 1605 is simply continued across track 1603 to capture track 1603 securely in seam 1602. The point at which track 1603 is turned inward also provides a stop that prevents clip such as clip 350 from sliding past that point or from coming off of track 1603. If desired, multiple stitching passes 1606 may be made over track 1603 to lend strength to the connection.

The invention has now been described in detail for the purposes of clarity and understanding. However, those skilled in the art will appreciate that certain changes and modifications may be practiced within the scope of the appended claims.

What is claimed is:

1. A shopping cart liner for a shopping cart seat having a handle, a back support and two sides that extend between the handle and the back support, the shopping cart liner comprising:
   a body configured to nest in the shopping cart seat, the body having a front with a front edge, a back with a back edge, and two sides which each have a side edge, the body defining one or more openings positioned at the front to enable the feet of a child seated in the shopping cart seat to protrude through the body beneath the handle, wherein, when nested in the shopping cart seat, the front edge is draped over the handle, the back edge is draped over the back support, and the two side edges are draped over the sides of the shopping cart seat;
   a track comprising a flexible rod-like member, wherein the track is coupled to a portion of the shopping cart liner between the front edge and the one or more openings so that the child faces the track when the shopping cart liner is in use in the shopping cart seat, wherein the track projects away from the liner, and wherein the track is coupled to the liner such that the track is aligned with an elongate axis of the handle when the body is nested in the shopping cart seat; and
   at least one clip slidingly engaged with the track, wherein the clip is slidable along the track so as to be moveable along the handle in the direction of the elongate axis.

2. The shopping cart liner of claim 1, wherein the body is padded.

3. The shopping cart liner of claim 1, wherein the clip includes a central opening.

4. The shopping cart liner of claim 1, further comprising a seat belt for securing the child to the shopping cart liner.

5. The shopping cart liner of claim 1, wherein the track comprises a continuous outer surface and is embedded by wrapping it in a fabric sleeve sewn into the shopping cart liner.

6. The shopping cart liner of claim 1, in combination with a pillow disposed within the shopping cart liner to support the child when the shopping cart liner and pillow are in use, wherein the pillow is generally arc shaped, having two curved arms extending from a midsection, to define an open well to receive the child.

7. The shopping cart liner of claim 1, further comprising a pocket in an outside surface of the shopping cart liner.

8. The shopping cart liner of claim 1, in combination with an item attached to the shopping cart liner via the clip.

9. The shopping cart liner of claim 3, in combination with an item to be attached to the shopping cart liner, the item comprising a main body larger than the opening in the clip, and the item including a compressible member connected to the main body, wherein the compressible member is larger than the opening when the compressible member is in an uncompressed state, and the compressible member is configured to be compressible to a size smaller than the opening so that the compressible member can be passed through the opening to place the compressible member and the main body on opposite sides of the opening.

10. The combination of claim 9, wherein the item comprises an item selected from the group consisting of a toy, a doll, a ball, a mirror, a block, a pyramid, a teething ring, a toy shaped like an animal or insect, a toy shaped like a plant or flower, an item that generates sound, an item that generates vibration, and an item that generates light.

11. The shopping cart liner of claim 9, wherein the main body comprises a book that is coupled to the compressible member by a tether.

12. The shopping cart liner of claim 1, wherein the track comprises a welt having at least a portion with a substantially circular cross section, wherein the welt is made of foam, rubber, or plastic and includes an integrally formed flange.

13. The shopping cart liner of claim 1, in combination with a tote bag.

14. A liner for a seat having a front rail, a back support and two sides that extend between the front rail and the back support, the liner comprising:
   a body configured to nest in the seat, the body having a front with a front edge, a back with a back edge, and two sides that each have a side edge, the body defining one or more openings positioned at the front to enable the feet of a child seated in the seat to protrude through the body beneath the front rail, wherein, when nested in the seat, the front edge is draped over the front rail, the back edge is draped over the back support, and the two side edges are draped over the sides of the seat;
   a track comprising a flexible rod-like member, wherein the track is coupled to a portion of the seat liner between the front edge and the one or more openings so that the child faces the track when the seat liner is in use in the seat, wherein the track projects away from the liner, and wherein the track is coupled to the liner such that the track is aligned with an elongate axis of the front rail when the body is nested in the seat; and
   at least one clip slidingly engaged with the track, wherein the clip is slidable along the track so as to be moveable along the front rail in the direction of the elongate axis.

15. The liner for a seat of claim 14, wherein the seat liner is configured to nest in a seat portion of a high chair or a shopping cart.

16. The liner for a seat of claim 14, wherein the clip defines an opening for attaching an item to the seat liner.

17. The liner for a seat of claim 14, wherein the track comprises a continuous outer surface and is embedded by wrapping it in a fabric sleeve sewn into the shopping cart liner.

18. The liner for a seat of claim 14, in combination with an item to be attached to the liner, the item comprising a main body larger than an opening in the clip, and the item including a compressible member connected to the main body, wherein the compressible member is larger than the opening when the compressible member is in an uncompressed state, and the compressible member is configured to be compressible to a size smaller than the opening so that the compressible member can be passed through the opening to place the compressible member and the main body on opposite sides of the opening; and wherein the main body comprises a book that is coupled to the compressible member by a tether.

19. A method of using a seat liner, the method comprising:
providing a seat liner comprising a body configured to nest in the seat, the body having a front with a front edge, a back with a back edge, and two sides that each have a side edge, the body defining one or more openings positioned at the front to enable the feet of a child seated in the seat to protrude through the body beneath a front rail, and a track comprising a flexible rod-like member, wherein the track is coupled to a portion of the seat liner between the front edge and the one or more openings so that the child faces the track when the seat liner is in use in the seat, wherein the track projects away from the liner, and wherein the track is coupled to the liner such that the track is aligned with an elongate axis of the front rail when the body is nested in the seat;

nesting the seat liner in a seat portion of a seat, wherein, when nested in the seat, the front edge is draped over a front rail of the seat, the back edge is draped over a back support of the seat, and the two side edges are draped over sides of the seat that extend between the front rail and the back support; and seating the child in the seat liner so that the child faces the track; and sliding a clip along the front rail in the direction of the elongate axis.

20. The method of claim 19, further comprising attaching an item to the clip via an opening in the clip.

21. The method of claim 20, further comprising adjusting the position of the item by sliding the clip along the track.

22. The method of claim 19, wherein the liner further includes a seat belt, the method further comprising securing the seat belt around the child.

* * * * *